(12) United States Patent
Wiegman

(10) Patent No.: US 11,522,372 B1
(45) Date of Patent: Dec. 6, 2022

(54) CHARGER FOR AN ELECTRIC AIRCRAFT WITH FAILURE MONITORING AND A METHOD FOR ITS USE

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/563,192

(22) Filed: Dec. 28, 2021

(51) Int. Cl.
| | | |
|---|---|---|
| *H02J 7/00* | (2006.01) | |
| *B60L 53/16* | (2019.01) | |
| *B60L 53/62* | (2019.01) | |
| *B60L 58/10* | (2019.01) | |
| *B64F 1/36* | (2017.01) | |
| *H02J 13/00* | (2006.01) | |

(52) U.S. Cl.
CPC ............ *H02J 7/0029* (2013.01); *B60L 53/16* (2019.02); *B60L 53/62* (2019.02); *B60L 58/10* (2019.02); *B64F 1/362* (2013.01); *H02J 7/007* (2013.01); *H02J 7/00036* (2020.01); *H02J 7/0047* (2013.01); *H02J 13/00002* (2020.01); *B60L 2200/10* (2013.01); *H02J 2310/44* (2020.01)

(58) Field of Classification Search
None
See application file for complete search history.

(56) References Cited

U.S. PATENT DOCUMENTS

| | | | |
|---|---|---|---|
| 8,244,422 B2 | 8/2012 | Fujitake | |
| 9,178,379 B2 | 11/2015 | Choi | |
| 9,340,118 B2 | 5/2016 | Endo | |
| 10,471,830 B2 | 11/2019 | Kojima | |

(Continued)

FOREIGN PATENT DOCUMENTS

| | | | | |
|---|---|---|---|---|
| CN | 110182083 A | | 12/2020 | |
| EP | 3226377 B1 | * | 1/2019 | ............ B60L 53/22 |
| KR | 102130598 B1 | | 7/2020 | |

OTHER PUBLICATIONS

Design and Implementation of a Smart Lithium-Ion Battery System with Real-Time Fault Diagnosis Capability for Electric Vehicles; Gao et al., Date: 2017.

*Primary Examiner* — Jared Fureman
*Assistant Examiner* — Aqeel H Bukhari
(74) *Attorney, Agent, or Firm* — Caldwell Intellectual Property Law, LLC

(57) ABSTRACT

Aspects relate to a charger for an electric aircraft with failure monitoring and method for its use. An exemplary charger for an electric aircraft with failure monitoring includes a charging circuit. Included within the charging circuit is a connector configured to mate with an electric aircraft port of an electric aircraft and at least a current conductor configured to conduct a current. At least a conductor comprises a direct current conductor configured to conduct a direct current; and an alternating current conductor configured to conduct an alternating current. A charger may include a control circuit configured to command the charging circuit of an electric aircraft as a function of charging datum. A charger may also include a failure monitor circuit, the failure monitor circuit configured to: detect a failure and initiate a failure mitigation procedure as a function of failure detection.

20 Claims, 5 Drawing Sheets

(56) References Cited

U.S. PATENT DOCUMENTS

| | | |
|---|---|---|
| 2014/0084859 A1 | 3/2014 | Hall |
| 2016/0096438 A1 | 4/2016 | Grimes |
| 2019/0030983 A1 | 1/2019 | Miller et al. |
| 2019/0229650 A1* | 7/2019 | Demont ................. B60L 50/40 |
| 2020/0254882 A1 | 8/2020 | Kwon et al. |

* cited by examiner

CHARGER FOR AN ELECTRIC AIRCRAFT WITH FAILURE MONITORING AND A METHOD FOR ITS USE

FIELD OF THE INVENTION

The present invention generally relates to the field of electric aircraft chargers. In particular, the present invention is directed to a charger for an electric aircraft with failure monitoring and a method for its use.

BACKGROUND

Electric vehicles typically derive their operational power from onboard rechargeable batteries. However, it can be a complex task to implement charging of these batteries in a safe manner.

SUMMARY OF THE DISCLOSURE

In an aspect charger for an electric vehicle with failure monitoring is provided. The charger includes a charging circuit. The charging circuit includes a connector configured to mate with an electric vehicle port of an electric vehicle and at least a current conductor configured to conduct a current. At least a current conductor may be configured as a direct current conductor configured to conduct a direct current and an alternating current conductor configured to conduct an alternating current. The charging circuit also includes a control circuit configured to command the charging circuit of an electric aircraft as a function of charging datum. A failure monitor circuit, wherein a failure monitor circuit is configured to detect a failure and initiate a failure mitigation as a function of the detection of a failure.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a charger with failure monitoring. In an embodiment, this can be accomplished by a control circuit configured to command the charging circuit of an electric aircraft as a function of the charging datum. Aspects of the present disclosure can desirably be used to protect a charging circuit. Aspects of the present disclosure can also be desirably used to protect an electric aircraft which is being charged. Aspects of the present disclosure advantageously allow for automatic termination and/or regulation of charging thereby desirably providing a safeguard so that potential damage to electric aircraft can be avoided and safety is maintained. Exemplary embodiments illustrating aspects of the present disclosure are described below in the context of several specific examples.

Figure 1:
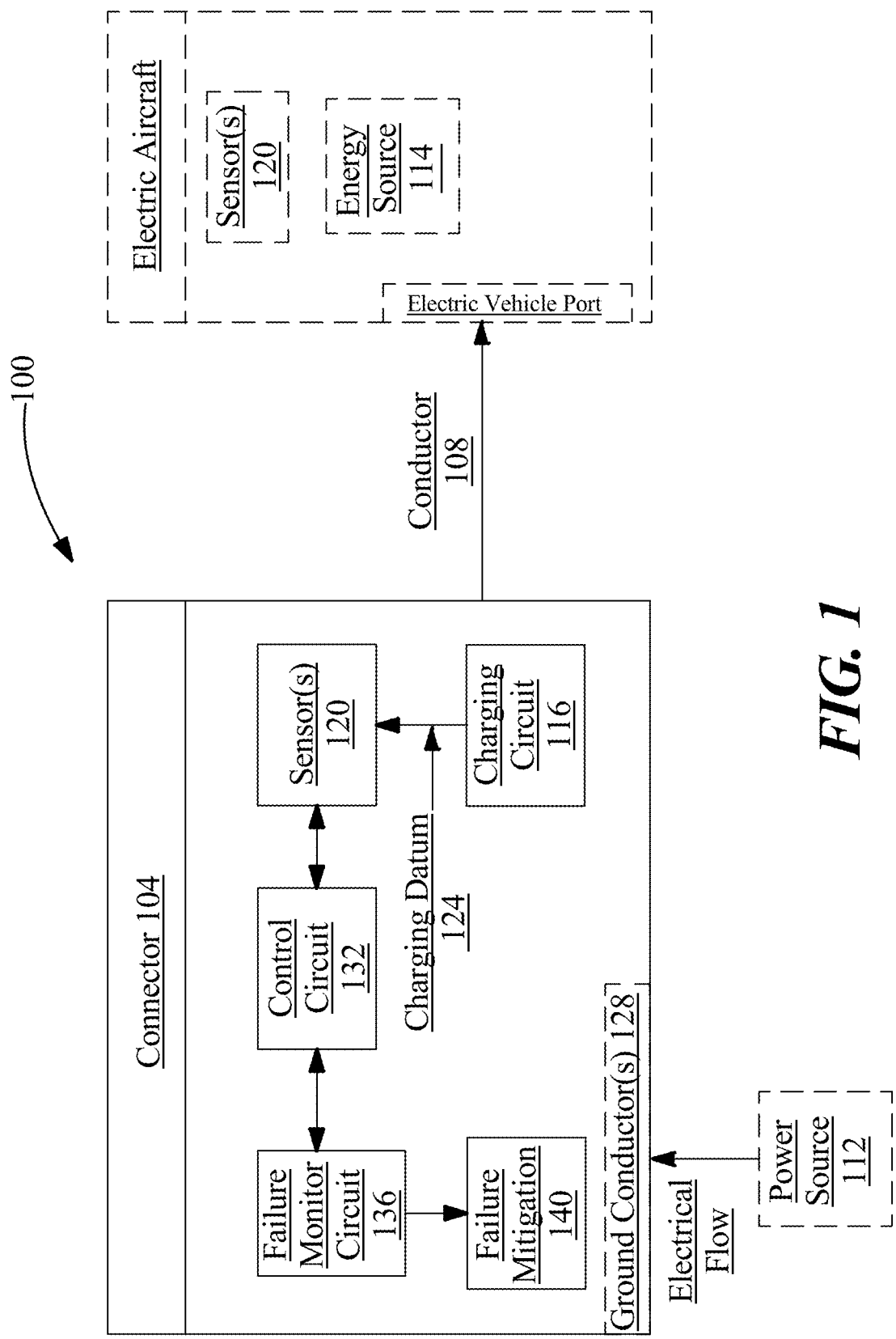
FIG. 1 is a block diagram of an exemplary system for a charger for an electric vehicle with failure monitoring.

Still referring to FIG. 1, connector 104 may be configured in various manners, as needed or desired, for example and without limitation, to facilitate charging or recharging of electric aircraft. As used in this disclosure, a "connector" is a distal end of a tether or a bundle of tethers, e.g., hose, tubing, cables, wires, and the like, which is configured to removably attach with a mating component, for example without limitation a port. As used in this disclosure, a "port" is an interface for example of an interface configured to receive another component or an interface configured to transmit and/or receive signal on a computing device. For example in the case of an electric vehicle port, the port may interface with a number of conductors and/or a coolant flow path by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port. Certain features of systems, methods and connectors including a charging connector, controller and associated components and devices, which may efficaciously be utilized in accordance with certain embodiments of the present disclosure are disclosed in U.S. Nonprovisional application Ser. No. 17/405,840, filed on Aug. 18, 2021, entitled "CONNECTOR AND METHODS OF USE FOR CHARGING AN ELECTRIC VEHICLE," the entirety of which is incorporated herein by reference.

Continuing to refer to FIG. 1, connector 104 may be configured to mate with a port, for example electrical aircraft port. As used in this disclosure, "mate" is an action of attaching two or more components together. As used in this disclosure, an "electric aircraft port" is a port located on electric aircraft. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 104. In some cases, mate may be lockable. As used in this disclosure, a "mating component" is a component that is configured to mate with at least another component, for example in a certain (i.e., mated) configuration. As used in this disclosure, an "electric vehicle" is any electrically powered means of human transport, for example without limitation an electric aircraft or electric vertical take-off and landing (eVTOL) aircraft. In some cases, an electric vehicle or aircraft may include an energy source configured to power at least a motor configured to move the electric vehicle or aircraft. As used in this disclosure, an "electric aircraft" is an electrically powered aircraft such as one powered by one or more electric motors or the like. In some embodiments, electric (or electrically powered) aircraft may be an electric vertical takeoff and landing (eVTOL) aircraft.

Still referring to FIG. 1, connector 104 may be used to charge or recharge a battery, for example, and without limitation, that of an electric aircraft. Connector may also be referred to in this disclosure as charging connector or charger. Connector, charging connector or charger may efficaciously include, without limitation, a constant voltage charger, a constant current charger, a taper current charger, a pulsed current charger, a negative pulse charger, an IUI charger, a trickle charger, a float charger, a random charger, and the like, among others. Connector, charging connector or charger may include any component configured to link an electric vehicle to the connector, charging connector or charger.

With continued reference to FIG. 1, system 100 may include one or more conductors 108 having a distal end approximately located within electric aircraft. As used in this disclosure, a "conductor" is a component that facilitates conduction. As used in this disclosure, "conduction" is a process by which one or more of heat and/or electricity is transmitted through a substance, for example when there is a difference of effort (i.e., temperature or electrical potential) between adjoining regions. In some cases, a conductor 108 may be configured to charge and/or recharge an electric vehicle. For instance, conductor 108 may be connected to a power source 112 and conductor may be designed and/or configured to facilitate a specified amount of electrical power, current, or current type. For example, a conductor 108 may include a direct current conductor. As used in this disclosure, a "direct current conductor" is a conductor configured to carry a direct current for recharging an energy source 114. As used in this disclosure, "direct current" is one-directional flow of electric charge. In some cases, a conductor 108 may include an alternating current conductor. As used in this disclosure, an "alternating current conductor" is a conductor configured to carry an alternating current for recharging an energy source 114. As used in this disclosure, an "alternating current" is a flow of electric charge that periodically reverse direction; in some cases, an alternating current may change its magnitude continuously with in time (e.g., sine wave).

With continued reference to FIG. 1, system 100 may include a conductor 108 in electric communication with power source 112. As used in this disclosure, a "conductor" is a physical device and/or object that facilitates conduction, for example electrical conduction and/or thermal conduction. In some cases, a conductor may be an electrical conductor, for example a wire and/or cable. Exemplary conductor materials include metals, such as without limitation copper, nickel, steel, and the like. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity)

With continued reference to FIG. 1, connector 108 may be electrically connected to a power source 112 configured to provide an electrical charging current. As used in this disclosure, a "power source" is a source of electrical power, for example for charging a battery. In some cases, power source 112 may include a charging battery (i.e., a battery used for charging other batteries). A charging battery is notably contrasted with an electric vehicle battery, which is located for example upon an electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Power source 112 may house a variety of electrical components. In one embodiment, power source 112 may contain a solar inverter. Solar inverter may be configured to produce on-site power generation. In one embodiment, power generated from solar inverter may be stored in a charging battery. In some embodiments, charging battery may include a used electric vehicle battery no longer fit for service in a vehicle. Charging battery 116 may include any battery described in this disclosure.

In some embodiments, and still referring to FIG. 1, power source 112 may have a continuous power rating of at least 350 kVA. In other embodiments, power source 112 may have a continuous power rating of over 350 kVA. In some embodiments, power source 112 may have a battery charge range up to 950 Vdc. In other embodiments, power source 112 may have a battery charge range of over 950 Vdc. In some embodiments, power source 112 may have a continuous charge current of at least 350 amps. In other embodiments, power source 112 may have a continuous charge current of over 350 amps. In some embodiments, power source 112 may have a boost charge current of at least 500 amps. In other embodiments, power source 112 may have a boost charge current of over 500 amps. In some embodiments, power source 112 may include any component with the capability of recharging an energy source of an electric vehicle. In some embodiments, power source 112 may include a constant voltage charger, a constant current charger, a taper current charger, a pulsed current charger, a negative pulse charger, an IUI charger, a trickle charger, and a float charger.

Still referring to FIG. 1, embodiments of system 100 may include a charging circuit 116. As defined in this disclosure, a "charging circuit" is an electrical circuit including anything charging or being charged, from batteries of charging station to batteries of aircraft. The charging circuit also includes components that are involved in charging the battery of the electric vehicle. Examples of components of the charging circuit include but is not limited to batteries, conductor 108, sensors 120, power source 112, connectors 104, electric vehicle ports, ground conductors 128, and the like.

With continued reference to FIG. 1, in some embodiments, at least a sensor 120 is configured to detect collect charging datum from the charging circuit. For the purposes of this disclosure, "Charging datum" is an electronic signal representing an information and/or a parameter of a detected electrical and/or physical characteristic and/or phenomenon correlated with a state of a charging circuit which includes all elements/parts relating to charging the electric vehicle including battery. Charging datum may also include a measurement of resistance, current, voltage, moisture, and temperature. Charging datum may also include information regarding the degradation or failure of a component of the charging circuit.

With continued reference to FIG. 1, in some embodiments, at least a sensor 120 is configured to detect collect battery datum from the charging circuit. For the purposes of this disclosure, "Battery datum" is an electronic signal representing an information and/or a parameter of a detected electrical and/or physical characteristic and/or phenomenon correlated with a state of a battery. In some embodiments, sensor 120 is communicatively connected to a control circuit. The control circuit may then make a determination if there is battery failure as a function of the battery datum.

Still referring to FIG. 1, as used in this disclosure, a "sensor" is a device that is configured to detect a phenomenon and transmit information related to the detection of the phenomenon. For example, in some cases a sensor may transduce a detected phenomenon, such as without limitation, voltage, current, speed, direction, force, torque, resistance, moisture temperature, pressure, and the like, into a sensed signal. Sensor may include one or more sensors which may be the same, similar or different. Sensor may include a plurality of sensors which may be the same, similar or different. Sensor may include one or more sensor suites with sensors in each sensor suite being the same, similar or different.

Still referring to FIG. 1, sensor(s) 120 may include any number of suitable sensors which may be efficaciously used to detect charging datum 148. For example, and without limitation, these sensors may include a voltage sensor, current sensor, multimeter, voltmeter, ammeter, electrical current sensor, resistance sensor, impedance sensor, capacitance sensor, a Wheatstone bridge, displacements sensor, vibration sensor, Daly detector, electroscope, electron multiplier, Faraday cup, galvanometer, Hall effect sensor, Hall probe, magnetic sensor, optical sensor, magnetometer, magnetoresistance sensor, MEMS magnetic field sensor, metal detector, planar Hall sensor, thermal sensor, and the like, among others. Sensor(s) 120 may efficaciously include, without limitation, any of the sensors disclosed in the entirety of the present disclosure.

Still referring to FIG. 1, in some embodiments of system 100, the charging circuit may include ground conductor(s) 128. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration. Ground conductor 128 functions to provide a grounding or earthing path, for example, for any abnormal, excess or stray electricity or electrical flow.

With continued reference to FIG. 1, in some embodiments of system 100, sensor 120 may be communicatively connected with control circuit 132. Sensor 120 may communicate with control circuit 132 using an electric connection. Alternatively, sensor 120 may communicate with control circuit 132 wirelessly, such as by radio waves, Bluetooth, or Wi-Fi. One of ordinary skill in the art, upon reviewing the entirety of this disclosure, would recognize that a variety of wireless communication technologies are suitable for this application.

With continued reference to FIG. 1, control circuit 132 may be communicatively connected with charging circuit 116. control circuit 132 may be configured to receive charging datum 124 from sensor 120. Problems within the charging circuit 116 may be determined by the control circuit 132 as a function of the charging datum 124. Additionally, the charging circuit 116 may determine problems within the control circuit 132 by comparing charging datum 124 to a predetermined value. When control circuit 132 receives charging datum 124 from sensor 120 that indicate problems within the charging circuit, then control circuit 132 may send a communication to the charging circuit to terminate charging. As used in this disclosure, "termination of charging" may include any means, process and/or method of disconnecting the electric vehicle charging connector from the electric vehicle, such that power is not transmitted. Control circuit 132 may also send a notification to a user interface signifying that there are problems charging or that charging has been terminated.

With continued reference to FIG. 1, in some embodiments, control circuit 132 may be implemented using an analog circuit. For example, in some embodiments control circuit 132 may be implemented using an analog circuit using operational amplifiers, comparators, transistors, or the like. In some embodiments, control circuit 132 may be implemented using a digital circuit having one or more logic gates. In some embodiments, controller may be implemented using a combinational logic circuit, a synchronous logic circuit, an asynchronous logic circuit, or the like. In other embodiments, control circuit 132 may be implemented using an application specific integrated circuit (ASIC). In yet other embodiments control circuit 132 may be implemented using a field programmable gate array (FPGA) and the like.

With continued reference to FIG. 1, system 100 includes a control circuit 132. control circuit 132 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. control circuit 132 may include a single computing device operating independently, or may include two or more computing device operating in concert, in parallel, sequentially or the like; two or more computing devices may be included together in a single computing device or in two or more computing devices. Control circuit 132 may interface or communicate with one or more additional devices as described below in further detail via a network interface device. Network interface device may be utilized for connecting control circuit to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Control circuit 132 may include but is not limited to, for example, a computing device or cluster of computing devices in a first location and a second computing device or cluster of computing devices in a second location. Control circuit 132 may include one or more computing devices dedicated to data storage, security, distribution of traffic for load balancing, and the like. Control circuit 132 may distribute one or more computing tasks as described below across a plurality of computing devices of computing device, which may operate in parallel, in series, redundantly, or in any other manner used for distribution of tasks or memory between computing devices. Control circuit 132 may be implemented using a "shared nothing" architecture in which data is cached at the worker, in an embodiment, this may enable scalability of system 100 and/or computing device.

With continued reference to FIG. 1, control circuit 132 may be designed and/or configured to perform any method, method step, or sequence of method steps in any embodiment described in this disclosure, in any order and with any degree of repetition. For instance, control circuit 132 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Control circuit 132 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments system 100 may include a failure monitoring circuit 136. As used in this disclosure, a "failure monitoring circuit" is a circuit used to detect failure withing the charging circuit 116. In some embodiments, failure monitoring circuit 136 may be coextensive with the earlier disclosure of control circuit 132. In an embodiment, failure monitoring circuit 136 may be any computing device disclosed in FIG. 1-5. As used in this disclosure, a "failure" is a fault or unhandled exception that is produced by the control circuit 132. Failure monitoring circuit 136 may be communicatively connected with charging circuit 116 and control circuit 132. Failure monitoring circuit 136 may be configured to receive charging datum 124 from sensor 120. Failure monitoring circuit 136 makes a determination if there is a fault or an unhandled exception in the charging circuit 116 by evaluating the output of control circuit 132. Failure within the charging circuit 116 may also be determined as a function of charging datum 124. Additionally, failure within the charging circuit may be determined by comparing charging datum 124 to a set of predetermined values.

With continued reference to FIG. 1, in some embodiments, failure monitoring circuit 136 may be implemented using an analog circuit. For example, in some embodiments failure monitoring circuit 136 may be implemented using an analog circuit using operational amplifiers, comparators, transistors, or the like. In some embodiments, failure monitoring circuit 136 may be implemented using a digital circuit having one or more logic gates. In some embodiments, controller may be implemented using a combinational logic circuit, a synchronous logic circuit, an asynchronous logic circuit, or the like. In other embodiments, failure monitoring circuit 136 may be implemented using an application specific integrated circuit (ASIC). In yet other embodiments control circuit 132 may be implemented using a field programmable gate array (FPGA) and the like.

Still referring to FIG. 1, in some embodiments of system 100 may include failure mitigation 140. As used in this disclosure, "failure mitigation" is a process where a failure in the system is detected and preventive steps are taken to avoid damage to the charging circuit. Failure mitigation may include a process used to stop or stall charging due to a failure within the charging circuit. In an embodiment, failure mitigation 140 may terminate charging if there is a failure detected within the charging circuit. As used in this disclosure, "termination of charging" may include any means, process and/or method of disconnecting the electric vehicle charging connector from the electric vehicle, such that power is not transmitted. In other embodiments, failure mitigation 140 may also send a notification to a user interface signifying that there is a failure within the charging circuit, that charging has been delayed, or that charging has been terminated. Failure mitigation 140 may be any computing device disclosed in FIG. 1-5. In some embodiments, the disclosure of failure mitigation 140 may be coextensive with the disclosure of failure monitoring circuit 136.

Figure 2:
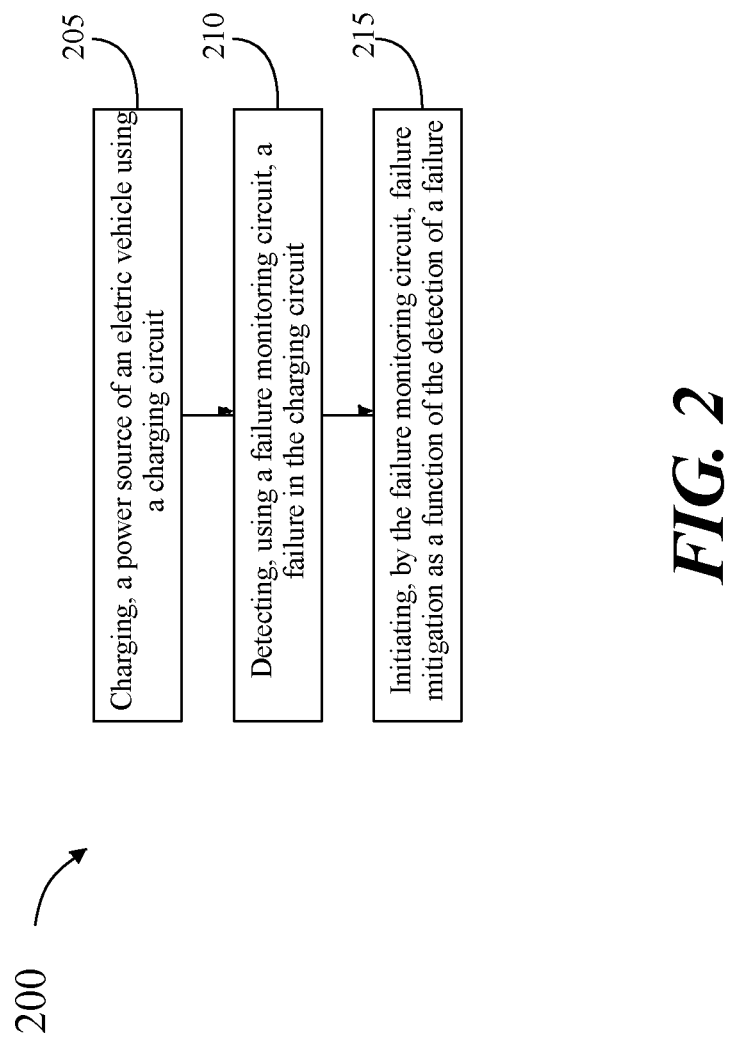
FIG. 2 is a flow diagram illustrating a method of use for a charger for an electric vehicle with failure monitoring.

Referring now to FIG. 2, an exemplary method 200 of use for a charger for an electric vehicle with failure monitoring. An electric vehicle may include any electric vehicle described in this disclosure, for example with reference to FIGS. 1-5. Charger may include any apparatus described in this disclosure, for example with reference to FIGS. 1-5. At step 205, method 200 may include charging a power source of an electric vehicle using a charging circuit. A charging circuit may include any charging element described in in this disclosure, for example with reference to FIGS. 1-5. A power source may include any power sourced described in in this disclosure, for example with reference to FIGS. 1-5.

With continued reference to FIG. 2, at step 210, method 200 may include detecting using a failure monitoring circuit a failure in the charging circuit. A failure monitoring circuit may include any circuit described in this disclosure, for example with reference to FIGS. 1-5. A failure monitoring circuit may include any computing device described in this disclosure, for example with reference to FIGS. 1-5. A control circuit may include any computing device described in this disclosure, for example with reference to FIGS. 1-5.

With continued reference to FIG. 2, at step 215, method 200 may initiating by a failure monitoring circuit, failure mitigation as a function of the detection of a failure. A failure mitigation may include any circuit described in this disclosure, for example with reference to FIGS. 1-5. A failure mitigation may include any computing device described in this disclosure, for example with reference to FIGS. 1-5.

Figure 3:
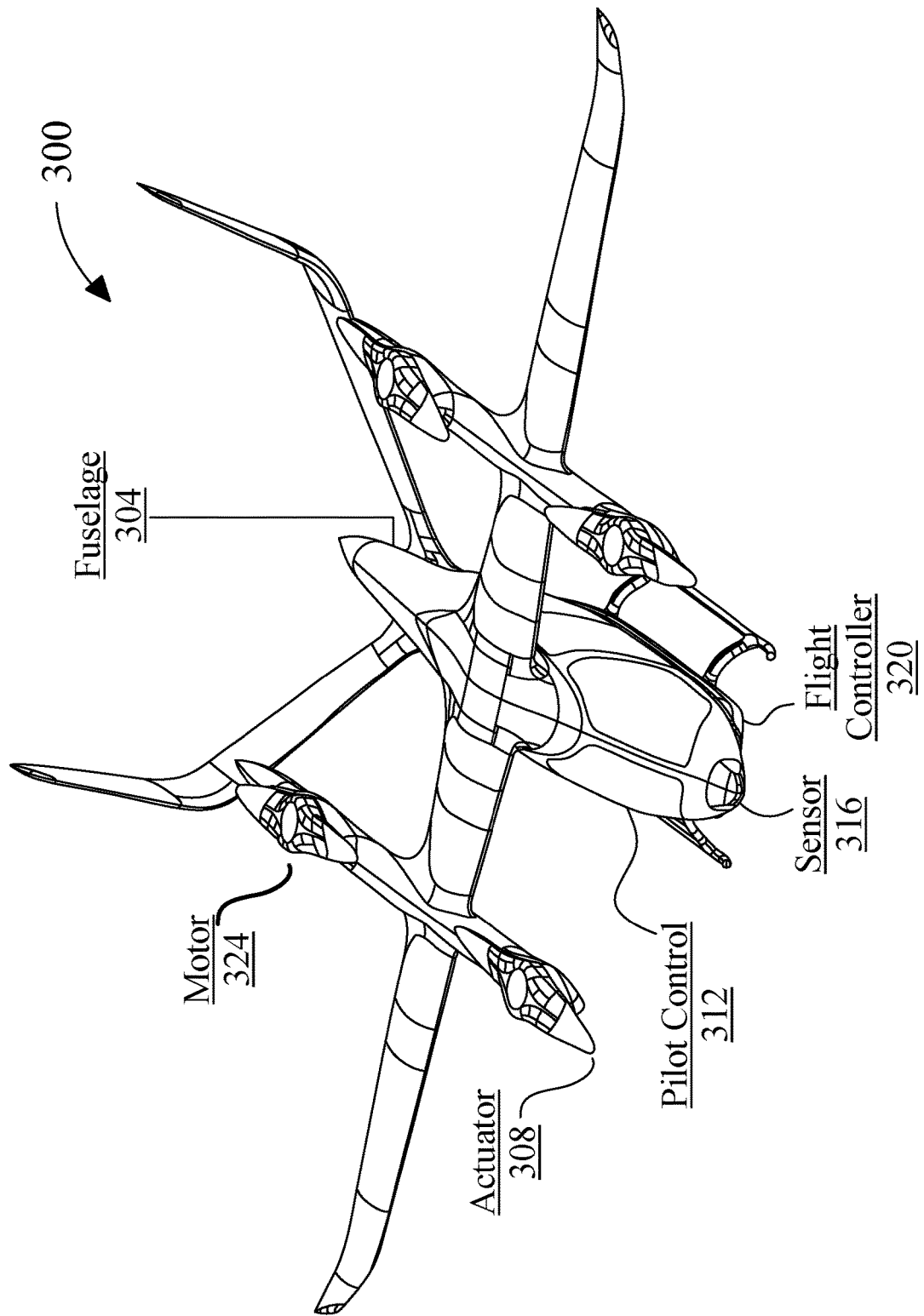
FIG. 3 is a schematic of an exemplary electric aircraft.

Referring now to FIG. 3, an exemplary embodiment of an aircraft 300 is illustrated. Aircraft 300 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 3, aircraft 300 may include a fuselage 304. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 304 may comprise structural elements that physically support the shape and structure of an aircraft. Structural elements may take a plurality of forms, alone or in combination with other types. Structural elements may vary depending on the construction type of aircraft and specifically, the fuselage. Fuselage 304 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 3, aircraft 300 may include a plurality of actuators 308. Actuator 308 may include any motor and/or propulsor described in this disclosure, for instance in reference to FIGS. 1-5. In an embodiment, actuator 308 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 3, a plurality of actuators 308 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 308 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 308 may include a rudder, which may include, without limitation, a segmented rudder that produces a torque about a vertical axis. Additionally or alternatively, plurality of actuators 308 may include other flight control surfaces such as propulsors, rotating flight controls, or any other structural features which can adjust movement of aircraft 300. Plurality of actuators 308 may include one or more rotors, turbines, ducted fans, paddle wheels, and/or other components configured to propel a vehicle through a fluid medium including, but not limited to air.

Still referring to FIG. 3, plurality of actuators 308 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 3, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 3, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 3, plurality of actuators 308 may include power sources, control links to one or more elements, fuses, and/or mechanical couplings used to drive and/or control any other flight component. Plurality of actuators 308 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 3, plurality of actuators 308 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 3, an energy source may be used to provide a steady supply of electrical power to a load over a flight by an electric aircraft 300. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 3, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 3, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 3, another exemplary actuator may include landing gear. Landing gear may be used for take-off and/or landing/Landing gear may be used to contact ground while aircraft 300 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 3, aircraft 300 may include a pilot control 312, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 308. For example and without limitation, collective control may alter and/or adjust the pitch angle of all of the main rotor blades collectively. For example, and without limitation pilot control 312 may include a yoke control. As used in this disclosure a "yoke control" is a mechanical control of an aircraft to control the pitch and/or roll. For example and without limitation, yoke control may alter and/or adjust the roll angle of aircraft 300 as a function of controlling and/or maneuvering ailerons. In an embodiment, pilot control 312 may include one or more footbrakes, control sticks, pedals, throttle levels, and the like thereof. In another embodiment, and without limitation, pilot control 312 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 300 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 300 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 3, pilot control 312 may be configured to modify a variable pitch angle. For example, and without limitation, pilot control 312 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 312 may modify the variable pitch angle from a first angle of 2.71° to a second angle of 3.82°. Additionally or alternatively, pilot control 312 may be configured to translate a pilot desired torque for flight component 308. For example, and without limitation, pilot control 312 may translate that a pilot's desired torque for a propeller be 160 lb. ft. of torque. As a further non-limiting example, pilot control 312 may introduce a pilot's desired torque for a propulsor to be 290 lb. ft. of torque. Additional disclosure related to pilot control 312 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 3, aircraft 300 may include a loading system. A loading system may include a system configured to load an aircraft of either cargo or personnel. For instance, some exemplary loading systems may include a swing nose, which is configured to swing the nose of aircraft 300 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 3, aircraft 300 may include a sensor 316. Sensor 316 may include any sensor or noise monitoring circuit described in this disclosure, for instance in reference to FIGS. 1-12. Sensor 316 may be configured to sense a characteristic of pilot control 312. Sensor may be a device, module, and/or subsystem, utilizing any hardware, software, and/or any combination thereof to sense a characteristic and/or changes thereof, in an instant environment, for instance without limitation a pilot control 312, which the sensor is proximal to or otherwise in a sensed communication with, and transmit information associated with the characteristic, for instance without limitation digitized data. Sensor 316 may be mechanically and/or communicatively coupled to aircraft 300, including, for instance, to at least a pilot control 312. Sensor 316 may be configured to sense a characteristic associated with at least a pilot control 312. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 316 may include at least a geospatial sensor. Sensor 316 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 300 for both critical and non-critical functions. Sensor may be incorporated into vehicle or aircraft or be remote.

Still referring to FIG. 3, in some embodiments, sensor 316 may be configured to sense a characteristic associated with any pilot control described in this disclosure. Non-limiting examples of a sensor 316 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 316 may sense a characteristic as an analog measurement, for instance, yielding a continuously variable electrical potential indicative of the sensed characteristic. In these cases, sensor 316 may additionally comprise an analog to digital converter (ADC) as well as any additionally circuitry, such as without limitation a Whetstone bridge, an amplifier, a filter, and the like. For instance, in some cases, sensor 316 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 300, for instance without limitation a computing system, a pilot display, and a memory component. Alternatively or additionally, sensor 316 may sense a characteristic of a pilot control 312 digitally. For instance in some embodiments, sensor 316 may sense a characteristic through a digital means or digitize a sensed signal natively. In some cases, for example, sensor 316 may include a rotational encoder and be configured to sense a rotational position of a pilot control; in this case, the rotational encoder digitally may sense rotational "clicks" by any known method, such as without limitation magnetically, optically, and the like.

Still referring to FIG. 3, electric aircraft 300 may include at least a motor 1224, which may be mounted on a structural feature of the aircraft. Design of motor 1224 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 1224 may include two main holes in top and bottom of mounting area to access bearing cartridge. Further, a structural feature may include a component of electric aircraft 300. For example, and without limitation structural feature may be any portion of a vehicle incorporating motor 1224, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 308. Persons skilled in the art, upon reviewing the entirety of this disclosure, will be aware of various materials, combinations of materials, and/or constructions techniques.

Still referring to FIG. 3, electric aircraft 300 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 3, a number of aerodynamic forces may act upon the electric aircraft 300 during flight. Forces acting on electric aircraft 300 during flight may include, without limitation, thrust, the forward force produced by the rotating element of the electric aircraft 300 and acts parallel to the longitudinal axis. Another force acting upon electric aircraft 300 may be, without limitation, drag, which may be defined as a rearward retarding force which is caused by disruption of airflow by any protruding surface of the electric aircraft 300 such as, without limitation, the wing, rotor, and fuselage. Drag may oppose thrust and acts rearward parallel to the relative wind. A further force acting upon electric aircraft 300 may include, without limitation, weight, which may include a combined load of the electric aircraft 300 itself, crew, baggage, and/or fuel. Weight may pull electric aircraft 300 downward due to the force of gravity. An additional force acting on electric aircraft 300 may include, without limitation, lift, which may act to oppose the downward force of weight and may be produced by the dynamic effect of air acting on the airfoil and/or downward thrust from the propulsor 308 of the electric aircraft. Lift generated by the airfoil may depend on speed of airflow, density of air, total area of an airfoil and/or segment thereof, and/or an angle of attack between air and the airfoil. For example, and without limitation, electric aircraft 300 are designed to be as lightweight as possible. Reducing the weight of the aircraft and designing to reduce the number of components is essential to optimize the weight. To save energy, it may be useful to reduce weight of components of electric aircraft 300, including without limitation propulsors and/or propulsion assemblies. In an embodiment, motor 1224 may eliminate need for many external structural features that otherwise might be needed to join one component to another component. Motor 1224 may also increase energy efficiency by enabling a lower physical propulsor profile, reducing drag and/or wind resistance. This may also increase durability by lessening the extent to which drag and/or wind resistance add to forces acting on electric aircraft 300 and/or propulsors.

Figure 4:
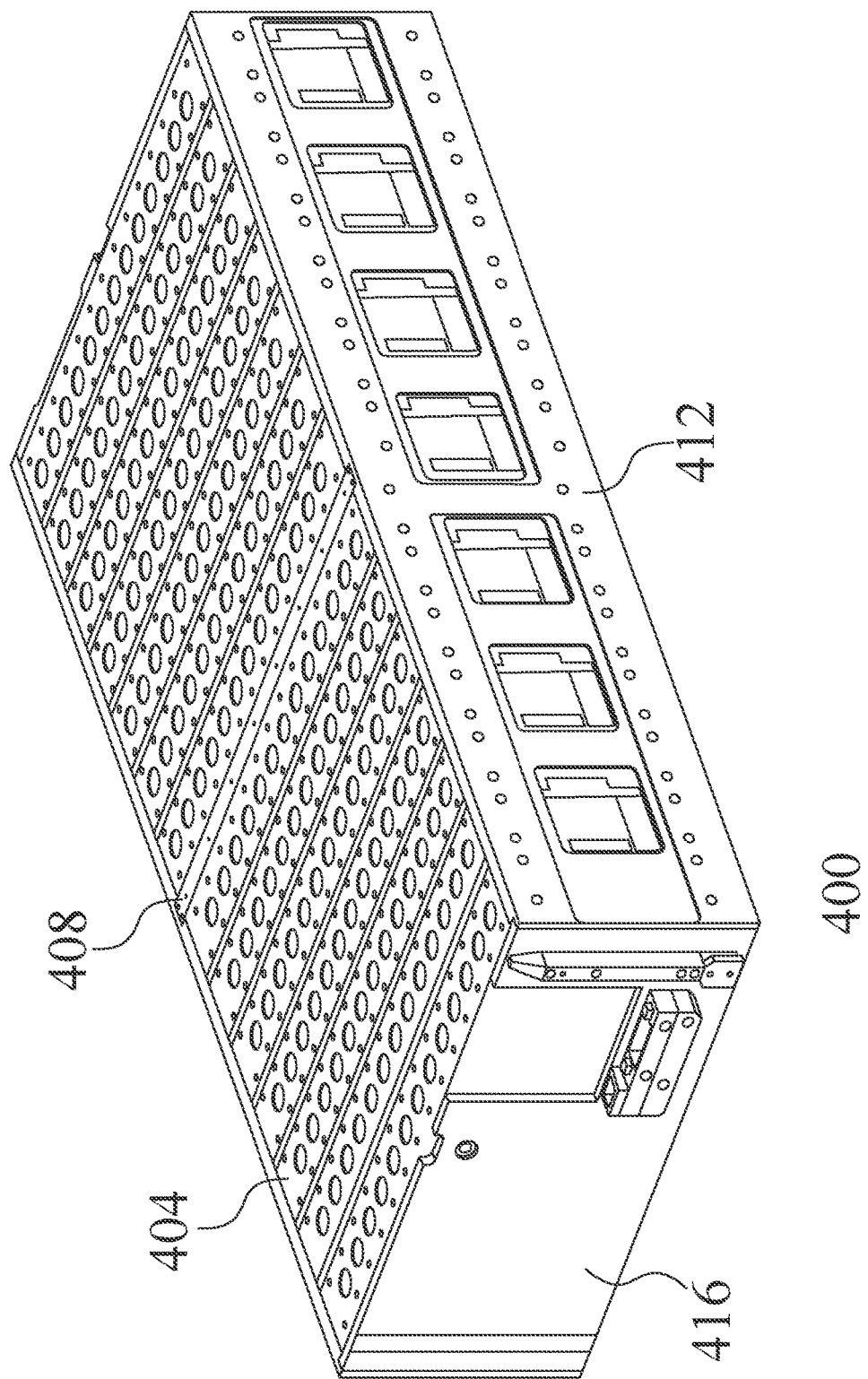
FIG. 4 is a front view embodiment of an exemplary embodiment of a battery pack.

FIG. 4 illustrates an exemplary embodiment of a battery pack 400 that may be housed in the power storage unit to store power. Battery pack 400 may be a power storing device that is configured to store electrical energy in the form of a plurality of battery modules, which themselves may be comprised of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, be electrically connected in series, in parallel or a combination of series and parallel. Series connection comprises wiring a first terminal of a first cell to a second terminal of a second cell and further configured to comprise a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not comprise wires may be prefabricated terminals of a first gender that mate with a second terminal with a second gender. Battery cells may be wired in parallel. Parallel connection comprises wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high current applications, or the like. In an exemplary embodiment, battery pack 400 may include at least 196 battery cells in series and at least 18 battery cells in parallel. This is, as someone of ordinary skill in the art would appreciate, only an example and battery pack 400 may be configured to have a near limitless arrangement of battery cell configurations.

With continued reference to FIG. 4, battery pack 400 may include a plurality of battery modules 404. The battery modules may be wired together in series and in parallel. Battery pack 400 may include a center sheet 408 which may include a thin barrier. The barrier may include a fuse connecting battery modules on either side of center sheet 408. The fuse may be disposed in or on center sheet 408 and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may comprise a thermal fuse, mechanical fuse, blade fuse, expulsion fuse, spark gap surge arrestor, varistor, or a combination thereof.

Battery pack 400 may also include a side wall 412 which may include a laminate of a plurality of layers configured to thermally insulate the plurality of battery modules 404 from external components of battery pack 400. Side wall 412 layers may include materials which possess characteristics suitable for thermal insulation such as fiberglass, air, iron fibers, polystyrene foam, and thin plastic films. Side wall 412 may additionally or alternatively electrically insulate the plurality of battery modules 404 from external components of battery pack 400 and the layers of which may include polyvinyl chloride (PVC), glass, asbestos, rigid laminate, varnish, resin, paper, Teflon, rubber, and mechanical lamina. Center sheet 408 may be mechanically coupled to side wall 412. Side wall 412 may include a feature for alignment and coupling to center sheet 408. This feature may comprise a cutout, slots, holes, bosses, ridges, channels, and/or other undisclosed mechanical features, alone or in combination.

Battery pack 400 may also include an end panel 416 having a plurality of electrical connectors and further configured to fix battery pack 400 in alignment with at least a side wall 412. End panel 416 may include a plurality of electrical connectors of a first gender configured to electrically and mechanically couple to electrical connectors of a second gender. End panel 416 may be configured to convey electrical energy from battery cells to at least a portion of an eVTOL aircraft. Electrical energy may be configured to power at least a portion of an eVTOL aircraft or comprise signals to notify aircraft computers, personnel, users, pilots, and any others of information regarding battery health, emergencies, and/or electrical characteristics. The plurality of electrical connectors may comprise blind mate connectors, plug and socket connectors, screw terminals, ring and spade connectors, blade connectors, and/or an undisclosed type alone or in combination. The electrical connectors of which end panel 416 comprises may be configured for power and communication purposes.

A first end of end panel 416 may be configured to mechanically couple to a first end of a first side wall 412 by a snap attachment mechanism, similar to end cap and side panel configuration utilized in the battery module. To reiterate, a protrusion disposed in or on end panel 416 may be captured, at least in part, by a receptacle disposed in or on side wall 412. A second end of end panel 416 may be mechanically coupled to a second end of a second side wall 412 in a similar or the same mechanism.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
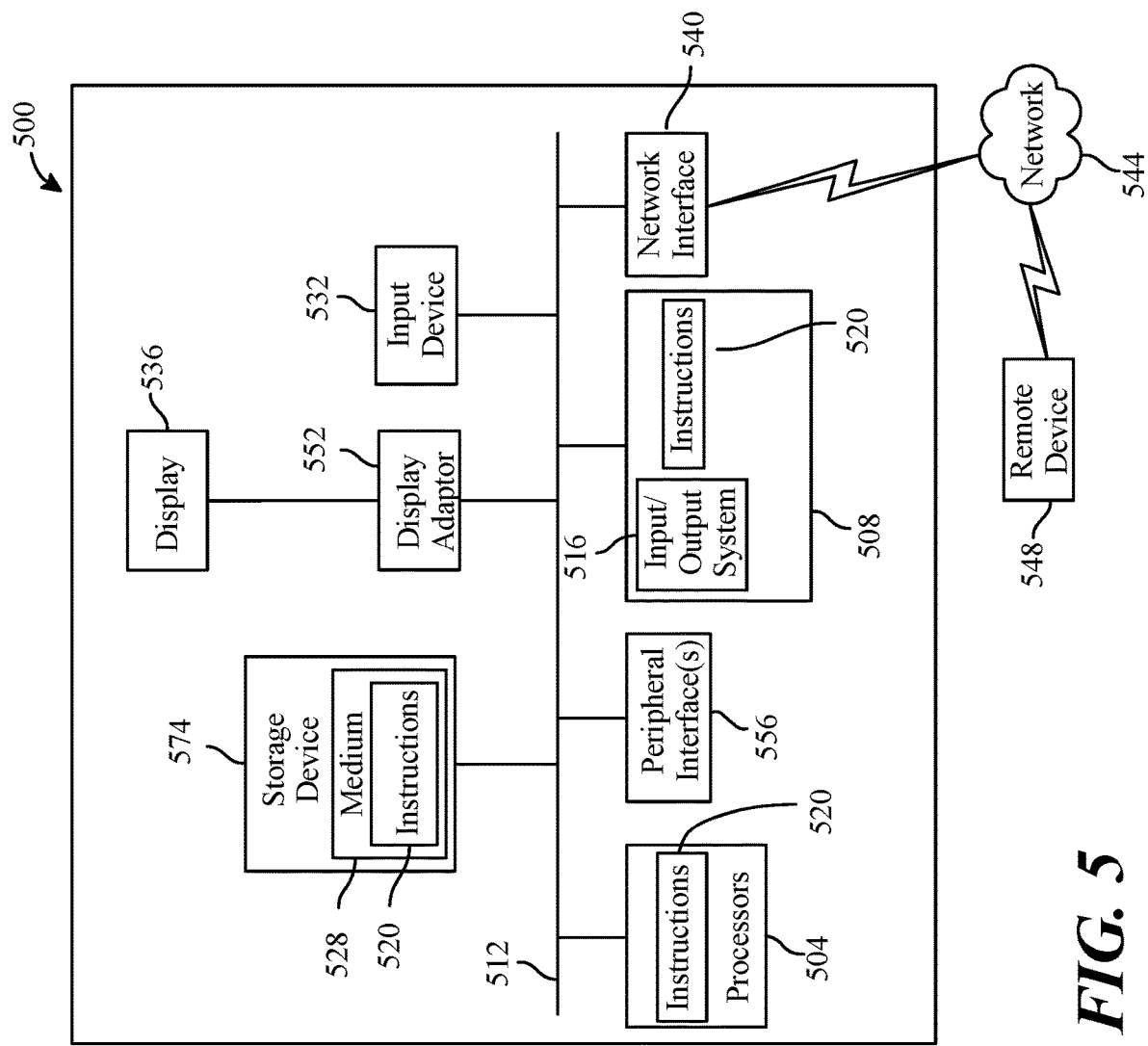
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A charger for an electric aircraft with failure monitoring, wherein the charger comprises:
    a charging circuit, the charging circuit including:
        a connector configured to mate with an electric aircraft port of an electric aircraft;
        at least a current conductor configured to conduct a current, wherein the at least a current conductor comprises:
            a direct current conductor configured to conduct a direct current; and
            an alternating current conductor configured to conduct an alternating current;
    a control circuit configured to command the charging circuit as a function of a charging datum, wherein the control circuit is further configured to control charging of an energy source of the electric aircraft through the charging circuit; and
    a failure monitoring circuit, the failure monitoring circuit configured to:
        detect a failure in the charging circuit; and
        initiate a failure mitigation as a function of the detection, wherein the failure monitoring circuit is distinct from the electric aircraft.

2. The charger of claim 1, wherein the failure monitoring circuit is configured to detect the failure as a function of the charging datum.

3. The charger of claim 1, wherein the failure mitigation further comprises termination of charging.

4. The charger of claim 1, wherein the failure mitigation further comprises transmitting a signal to a remote device.

5. The charger of claim 1, wherein at least a sensor is configured to detect a battery datum.

6. The charger of claim 5, wherein a computing device is configured to determine battery failure as a function of the battery datum.

7. The charger of claim 1, wherein the charging datum is stored using a data storage device.

8. The charger of claim 1, wherein at least a sensor is configured to detect temperature.

9. The charger of claim 1, wherein at least a sensor is configured to detect voltage.

10. The charger of claim 1, wherein at least a sensor is configured to detect current.

11. A method of failure monitoring in a charger for an electric aircraft, the method comprising:
    mating a connector, of a charging circuit of a charger, with an electric aircraft port of an electric aircraft;
    conducting, by at least a current conductor of the charging circuit, a current, wherein the at least a current conductor comprises:
        a direct current conductor configured to conduct a direct current; and
        an alternating current conductor configured to conduct an alternating current;
    commanding, by a control circuit of the charger, the charging circuit as a function of a charging datum, wherein the control circuit is further configured to control charging of an energy source of the electric aircraft through the charging circuit;
    detecting, by a failure monitoring circuit of the charger, a failure in the charging circuit; and
    initiating, by the failure monitoring circuit, a failure mitigation as a function of the detection, wherein the failure monitoring circuit is distinct from the electric aircraft.

12. The method of claim 11, wherein the failure monitoring circuit is configured to detect the failure as a function of the charging datum.

13. The method of claim 11, wherein the failure mitigation further comprises termination of charging.

14. The method of claim 11, wherein the failure mitigation further comprises transmitting a signal to a remote device.

15. The method of claim 11, wherein at least a sensor is configured to detect a battery datum.

16. The method of claim 15, wherein a computing device is configured to determine battery failure as a function of the battery datum.

17. The method of claim 11, wherein the charging datum is stored using a data storage device.

18. The method of claim 11, wherein at least a sensor is configured to detect temperature.

19. The method of claim 11, wherein at least a sensor is configured to detect voltage.

20. The method of claim 11, wherein at least a sensor is configured to detect current.

\* \* \* \* \*